Patented Nov. 26, 1935

2,021,896

UNITED STATES PATENT OFFICE 2,021,896

PROCESS FOR DIFFERENTIALLY LEACHING ORES TO SEPARATE LEAD AND OTHER METALS FROM ZINC SULPHIDE

Maxwell George Platten, Los Angeles, Calif.

No Drawing. Application January 9, 1932, Serial No. 585,806

6 Claims. (Cl. 75—18)

The present invention relates to treating ores, or compositions carrying lead and zinc values, and contemplates the provision of a new process for separating lead minerals and compounds from zinc sulphides, by the use of aqueous solutions carrying ferrous iron, cuprous copper and manganous manganese, any one or more, as the active solvents. Another feature of this invention is to provide a process of the character described in which the valuable metals may be removed from the solutions as metallic precipitates, leaving the solutions in condition ready for reuse or other uses.

As is well known to all metallurgists, the treatment of ores, products and compounds containing lead compounds and zinc sulphide either as simple or complex mixtures for the purpose of separating lead compounds from zinc sulphide especially lead sulphide from zinc sulphide is a metallurgical problem of great importance. No simple, easily operated and economical process has heretofore been devised.

By my process I secure practically a complete extraction of the lead, as well as other valuable metals such as gold, silver, copper and etc. which are taken into solution, while practically all of the zinc sulphide is left in the leached residue or tailings. The zinc sulphide can be recovered by concentration, flotation and smelting, or by roasting, leaching and precipitation, or by leaching and precipitation, or by any other desirable or suitable means.

The process depends upon the following discoveries which I have made, when treating ores, products and compounds containing gold, silver, copper, lead, any one or more, and zinc sulphide, while operating with the following aqueous solutions: neutral and acid chloride solutions containing as the active solvents, ferrous chloride, manganous chloride and cuprous chloride, any one or more, and thereby dissolving the gold, silver, copper, and lead, and other metals as chlorides, and leaving practically all of the zinc sulphide in the leached residue; and neutral and acid water solutions containing as the active solvents ferrous iron, manganous manganese and cuprous copper in the chloride, sulphate, nitrate or acetate state, any one or more, and thereby dissolving the gold, silver, copper and lead and other metals, as chlorides, sulphates, nitrates or acetates, any one or more, and leaving practically all of the zinc sulphide in the leached residue. The use of chloride solutions is preferable in most cases, while the use of neutral or acid water solutions containing the aforesaid active solvent or solvents is especially advantageous in the treatment of ores in remote places where the cost of transporting chlorides, such as the chlorides of sodium, calcium, potassium and magnesium would be prohibitive.

More specifically, I have found that simple and complex compounds of lead and zinc, simple sulphide ores of lead and zinc, oxidized-sulphide ores of lead and zinc, and complex sulphide ores of lead and zinc, can be leached by the following aqueous solutions: A saline solution of the chloride of sodium, calcium, potassium or magnesium, any one or more, (but sodium chloride would probably be ordinarily used on account of cheapness) and containing as the active solvent or solvents, ferrous chloride, cuprous chloride, and manganous chloride, any one or more; or by a water solution containing as the active solvent or solvents ferrous iron, manganous manganese, or cuprous copper any one or more; or either a saline or water solution containing an acid, as for example, an inorganic acid such as sulphuric, hydrochloric or nitric, any one or more, or containing an organic acid, such as acetic, tartaric or oxalic, any one or more, or containing both an inorganic acid and an organic acid as specified. I have found that the above named solvent solutions can be used to selectively or differentially dissolve or take the lead minerals or compounds into solution, in preference to the zinc sulphide, at any temperature from 2° C. up to and including the boiling point of the solutions. However, as the temperatures of the solutions are increased, the maximum rate of dissolving of the lead occurs at practically the boiling point of the solutions. I have also found in operating with the above named solutions, that a small amount of an inorganic acid or acids in some cases, for illustration 0.01%, and up to 1.0% can be added without taking very much of the zinc sulphide into solution.

In operation where the material undergoing treatment contains more acid consuming constituents, more acid is then necessary. Examples of the acid consuming constituents are the carbonates, oxides and hydroxides of Ca, Mg, Na, K, NH3, Ba, Fe, Mn, Cr, Cu, Bi, Cd, etc., which may be present in the raw ores and products, roasted ores and products, smelter products and by-products, concentrates, middlings and tailings, flotation concentrates, middlings and tailings, products and by-products from the treatment of ores by chemical processes, and slimy pulps which have been coagulated. However, the most practical and economical amount of acid which takes the minimum amount of zinc sulphide into solution, will have to be determined by experiment. I have also found that if a small amount of an inorganic acid or acids was used for the active solvent, that the action on the lead sulphide was relatively slow and that an appreciable amount of zinc sulphide was also taken into solution. If more acid was used, viz, a percentage calculated in slight excess over the theoretical required for the lead alone, I have found that although the speed of dissolving the lead was increased, an excessive amount of the zinc sulphide was taken into solution. I have further found that, if the solution carries ferrous iron calculated in small excess over the theoretical amount required, although more can be used, the lead is taken into solution, with only a small amount of the zinc sulphide being dissolved. If the solution also carries a small percentage of acid, ordinarily a trace up to 1.0%, the rate of solution of the lead is increased, with only a small increased percentage of the zinc being taken into solution. The addition of any excess acid takes more zinc into solution. If the solution carries a small amount of cuprous copper, usually a few hundredths of one per cent up to 0.5% copper, although in some cases more can be used, the lead is taken into solution with only a small amount of the zinc. As the amount of copper is increased, the speed of dissolving the lead is increased, but correspondingly more zinc is taken into solution. The addition of a small amount of acid, ordinarily from a trace up to 1.0%, to a solution carrying a small amount of cuprous copper, assists in speeding up the solution of the lead, without increasing the solution of the zinc to any appreciable extent. The addition of any excess acid is detrimental, as more zinc sulphide is taken into solution. When the solution carries manganous manganese, in small excess over the theoretical amount necessary, although more can be used, the lead is dissolved with a small amount of the zinc going into solution. If a small amount of acid, ordinarily from a trace up to 1.0%, is added to a solution carrying manganous manganese, the rate of solution of the lead is increased, without appreciably more zinc being dissolved, the addition of any excess acid increasing the amount of zinc sulphide taken into solution. I have also found that my process can be used to dissolve out lead compounds from zinc sulphide, especially lead sulphide from zinc sulphide if the solution contains a small amount of acid, ordinarily from a trace up to 1.0%, and cuprous copper and some ferrous iron and manganous manganese; or a small amount of acid, ordinarily a trace up to 1.0%, and cuprous copper and some ferrous iron; or a small amount of acid, ordinarily from a trace up to 1.0%, and cuprous copper and some manganous manganese; or a small amount of cuprous copper and some ferrous iron and manganous manganese; or a small amount of cuprous copper and some ferrous iron; or a small amount of cuprous copper and some manganous manganese; or some ferrous iron and manganous manganese. I have also found that in the above operations that a small amount of acid is ordinarily beneficial, as it assists in speeding up the reactions. If the material under treatment gives satisfactory recoveries with the solutions and solvents employed, the addition of acid is then not necessary. However, if the material under treatment carries valuable metals, which are sought for recovery, and which have some surface coating or oxidized film, which may hinder or prevent the active solvent or solvents from being comparatively rapidly effective, the addition of acid is then beneficial. The presence of acid in the solution may be dispensed with, where hydrolysis is not induced in the solution. Hydrolysis may be induced by aeration, by slow oxidation, by a drop in temperature of the hot or warm solutions, or by the addition of steam to raise or maintain the solution temperature, which in some cases causes an appreciable dilution of the solution.

In case it is desired to recover the small amount of zinc taken into solution during the solution of the lead and other valuable metals, then after the precipitation of the gold, silver, copper and lead and any other valuable metals, the solutions may be treated to recover the zinc content by any of the known processes of precipitation, and thereafter the solution may be returned for reuse, or for other uses, or discharged to waste as desired.

In the application of the process, the most desirable solution or solutions, whether neutral or acid and the percentages of the iron, manganese, and copper, one or more, the temperature and necessary time of contact, with the material under treatment crushed to the necessary fineness to obtain the maximum solution or dissolving of the lead and other metals, with the minimum amount of zinc sulphide being taken into solution, will obviously be varied to meet the particular conditions. That my process is very efficient in its operation, can be seen from the following examples: A complex lead-zinc sulphide ore carrying 0.03 oz. Au; 8.7 ozs. Ag; 5.5% Pb, and 9.6% Zn was crushed to pass 120 mesh and leached with a hot brine (sodium chloride) solution carrying 4.5% ferrous chloride and 0.25% $H_2SO_4$ for 8 minutes at approximately 85° C. The leached residue representing 90.2% of the original weight analyzed 0.02 oz. Au, 3.0 ozs. Ag, 0.2% Pb and 10.3% Zn indicating an extraction of 40.0% of the Au, 68.9% of the Ag, and 96.7% of the Pb with only 3.2% of the Zn. Another example was the treatment of a complex lead-zinc sulphide ore, containing 0.05 oz. Au; 11.2 ozs. Ag; 0.58% Cu; 9.2% Pb and 20.4% Zn, which was crushed to pass 120 mesh and leached for 10 minutes with a hot brine solution carrying 6.0% ferrous chloride, 1.5% manganous chloride and 0.35% $H_2SO_4$ at approximately 80° C. The leached residue represented 83.6% of the original weight and analyzed 0.02 oz. Au; 5.1 ozs. Ag; 0.09% Cu; 0.4% Pb and 23.9% Zn, showing an extraction of Au 66.7%; Ag 61.9%, Cu 87.1%, Pb 96.4% and Zn 2.1%. A mill flotation zinc-lead concentrate produced from a complex lead-zinc sulphide ore with a screen analysis showing all passing 120 mesh with 2.8% plus, and 97.2% minus 150 mesh, and carrying 0.11 oz. Au; 45.6 ozs. Ag; 44.5% Pb and 22.8% Zn, was leached for 11 minutes with a hot brine solution containing 10.5% ferrous chloride, 2.5% manganous chloride, 0.45% cuprous chloride and 0.6% HCl at approximately 85° C. The leached residue represented 52.4% of the original weight and analyzed 0.14 oz. Au; 24.3 ozs. Ag; 2.7% Pb and 41.7% Zn, showing an extraction of 31.1% of the gold, 72.1% of the silver, 96.8% of the lead and 4.2% of the zinc. By my process of differential leaching as shown by the above example, I not only extracted practically all of the lead but considerable of the silver and gold (the remaining silver and gold content being locked up in the leached residue and for the most part with the zinc sulphide) in a solution from which these metals may be recovered as metallic precipitates, but I also produced in the leached residue a valuable relatively high grade zinc concentrate from which the zinc content can be recovered by smelting or roasting, leaching and precipitation or other desirable or suitable means.

In the practical application of the process, the treatment in a general way may be carried out as follows: Ores, products, by-products, and compounds carrying lead values and zinc sulphide, and which may also carry other values, may be leached with a neutral or acid saline solution, and containing as the active solvent or solvents ferrous iron, manganous manganese or cuprous copper, any one or more; or with a neutral or acid water solution, and containing as the active solvent or solvents, ferrous iron, manganous manganese or cuprous copper, any one or more. The resulting pregnant solution which may be neutral or acid, will be passed around and in contact with metallic silver to precipitate metallic gold, and then around and in contact with metallic copper or lead to precipitate metallic silver, then around in contact with metallic lead or iron to precipitate metallic copper, and then, if the solution being precipitated is a saline solution, the pregnant lead solution may be passed around and in contact with metallic iron when lead will be precipitated in the metallic state, (using my process, U. S. Patent No. 1,480,110, for the precipitation of lead by iron from a saline solution). The solution may then be separated from the precipitated lead, by filtration or decantation or other suitable means, and returned for reuse or other uses, or discharged to waste as desired, and the leached residue or tailings may then be treated for the recovery of the zinc sulphide content, by concentration, flotation or smelting, or roasting, leaching and precipitation, or by any other desirable or suitable means. The leached residue or tailings may also be treated to recover any other valuable metals which may be present, either before or after the zinc sulphide recovery. Thus, by my process, as above described, I have separated all of the valuable metals from the zinc sulphide, thus effecting a separation of the lead and the zinc contents.

The invention resides in the employment of a slightly acid or neutral aqueous solution carrying ferrous iron, cuprous copper, and manganous manganese, any one or more, as active solvents for extracting lead, silver, copper, and gold, any one or more, by dissolving from an ore composition or product the last mentioned metals in preference to zinc sulphide contained in such ores, compositions, or products. I have discovered that in such a process, ferrous iron, manganous manganese, and cuprous copper are equivalents of one another in their solvent action.

In the claims where reference is made to a solution "not containing over about 1% of acid" it is intended to include not only solutions which contain acid but also solutions which contain no acid at all. Also, where reference is made to "acid neutralizing substances in the material to be leached", materials of the kind already mentioned in this specification are meant and not the lead and zinc sulphides which it is the object of this invention to separate.

What I claim is:—

1. The process as described of differentially extracting lead from lead-zinc ores, products, or compounds containing zinc sulphide that comprises leaching the ores, products, or compounds with a solution of a chloride selected from the group consisting of sodium, potassium, calcium and magnesium chlorides, said solution not containing over about 1% of acid in excess of that neutralized by the acid neutralizing substances in the material being leached and containing ferrous chloride as the active solvent, thereby dissolving the lead in the said solution and leaving the zinc sulphide in the leached residue.

2. The process as described of differentially extracting lead from lead-zinc ores, products, or compounds containing zinc sulphide that comprises leaching the ores, products, or compounds with a solution of a chloride selected from the group consisting of sodium, potassium, calcium and magnesium chlorides, said solution containing from a trace to 1% of an inorganic acid and containing ferrous chloride as the active solvent, thereby dissolving the lead in the said solution and leaving the zinc sulphide in the leached residue.

3. The process as described of differentially extracting lead from lead-zinc ores, products or compounds containing zinc sulphide, that comprises subjecting the said ores, products or compounds to the leaching action of a chloride solution, not containing over about 1% of acid in excess of that neutralized by the acid neutralizing substances in the material being leached, and containing ferrous chloride as the active solvent, thereby dissolving the lead in the said solution and leaving the zinc sulphide in the leached residue.

4. The process as described of differentially extracting lead from lead-zinc ores, products or compounds containing zinc sulphide that comprises subjecting the said ores, products or compounds to the leaching action of a water solution not containing over about 1% of acid in excess of that neutralized by the acid neutralizing substances in the material to be leached, and containing ferrous iron as the active solvent, thereby dissolving the lead in the said solution and leaving the zinc sulphide in the leached residue.

5. The process as described of differentially extracting lead from lead-zinc ores, products or compounds, containing zinc sulphide, that comprises subjecting the said ores, products or compounds to the leaching action of a water solution containing from a trace to 1% of acid and containing ferrous iron as the active solvent, thereby dissolving the lead in the said solution, and leaving the zinc sulphide in the leached residue.

6. The process as described of differentially extracting lead from lead-zinc ores, products or compounds containing zinc sulphide, that comprises subjecting the said ores, products or compounds to the leaching action of an acid-free, chloride solution containing ferrous chloride as the active solvent, thereby dissolving the lead in the said solution and leaving the zinc sulphide in the leached residue.

MAXWELL GEORGE PLATTEN.